United States Patent
Liang et al.

(10) Patent No.: US 9,266,758 B2
(45) Date of Patent: Feb. 23, 2016

(54) PROCESS FOR TREATING HALIDE CONTAMINATED WASTE

(71) Applicant: NATIONAL CHUNG-HSING UNIVERSITY, Taichung (TW)

(72) Inventors: Chen-Ju Liang, Taichung (TW); Ya-Ting Lin, Taichung (TW)

(73) Assignee: NATIONAL CHUNG-HSING UNIVERSITY, Taichung (TW)

( * ) Notice: Subject to any disclaimer, the term of this patent is extended or adjusted under 35 U.S.C. 154(b) by 0 days.

(21) Appl. No.: 14/189,510

(22) Filed: Feb. 25, 2014

(65) Prior Publication Data

US 2015/0051433 A1    Feb. 19, 2015

(30) Foreign Application Priority Data

Aug. 16, 2013 (TW) .............................. 102129483 A

(51) Int. Cl.

| | |
|---|---|
| *C02F 1/66* | (2006.01) |
| *C02F 1/70* | (2006.01) |
| *C02F 103/06* | (2006.01) |
| *C02F 101/16* | (2006.01) |
| *C02F 101/36* | (2006.01) |

(52) U.S. Cl.

CPC . *C02F 1/705* (2013.01); *C02F 1/66* (2013.01); *B01D 2251/108* (2013.01); *C02F 2101/16* (2013.01); *C02F 2101/36* (2013.01); *C02F 2103/06* (2013.01)

(58) Field of Classification Search

None
See application file for complete search history.

(56) References Cited

U.S. PATENT DOCUMENTS

| 4,022,795 A | * | 5/1977 | Bamfield et al. .............. 546/259 |
|---|---|---|---|
| 6,221,002 B1 | | 4/2001 | James |
| 7,045,339 B2 | * | 5/2006 | Sorenson et al. .......... 435/262.5 |
| 2002/0099253 A1 | * | 7/2002 | Terada et al. ................ 588/206 |

OTHER PUBLICATIONS

Ya-Ting Lin et al.; "Carbon Tetrachloride Degradation by Alkaline Ascorbic Acid Solution"; ACS Publications; pp. 3299-3307; 2013 (9 pages).

* cited by examiner

*Primary Examiner* — Melvin C Mayes
*Assistant Examiner* — Sheng H Davis
(74) *Attorney, Agent, or Firm* — Osha Liang LLP

(57) ABSTRACT

A process for treating halide contaminated waste includes bringing the contaminated waste into contact with a reductone in an aqueous solution to obtain a mixture having a pH value, and adjusting the pH value to permit dissociation of two hydrogen ions from an enediol group of the reductone and to permit subsequent reaction of the reductone with an electrophilic site of halide contained in the contaminated waste. Halide can thus be removed.

7 Claims, 5 Drawing Sheets

PROCESS FOR TREATING HALIDE CONTAMINATED WASTE

CROSS-REFERENCE TO RELATED APPLICATION

This application claims priority of Taiwanese application no. 102129483, filed on Aug. 16, 2013.

BACKGROUND OF THE INVENTION

1. Field of the Invention

This invention relates to a process for treating halide contaminated waste using a reductone, more particularly to a process for treating carbon tetrachloride using ascorbic acid.

2. Description of the Related Art

In the past, because carbon tetrachloride is stable and non-flammable, it was widely used as a solvent for manufacturing a dry cleaning agent, an adhesive for semiconductors, a cleaning agent for mechanical elements, etc. However, according to the classification of carcinogens by the International Agency for Research on Cancer, carbon tetrachloride is possibly carcinogenic to humans. In Taiwan, there are many ground water sites which are contaminated by chlorine-containing organic solvents, such as carbon tetrachloride. It is known that zerovalent metals (such as zerovalent iron, zerovalent zinc, etc.), bivalent iron ions, dithionite, sodium sulfide, hydrogen sulfide, etc., can serve as reducing agents to permit the chlorine-containing organic solvents to be reduced to a less toxic material or an environmentally safe material. However, such reducing agents are normally in a solid state, and thus the contact area between the reducing agents and the chlorine-containing organic solvents is limited. If such reducing agents are in the form of fine particles, they will have an increased surface area, hence the risk of spontaneous combustion.

U.S. Pat. No. 6,221,002 has disclosed that a sufficient amount of ascorbic acid can be used as a reducing agent to chemically reduce hexavalent chromium in COPR (chromite ore processing residue) contaminated soils to a lower valence state.

SUMMARY OF THE INVENTION

Therefore, an object of the present invention is to provide a process for treating waste contaminated by a halide of carbon or nitrogen. By virtue of the process of this invention, halide contained in the contaminated waste can be effectively removed without the above-mentioned risk of spontaneous combustion.

Accordingly, there is provided a process for treating waste contaminated by a halide of carbon or nitrogen, the halide contained in the waste having an electrophilic site. The process includes bringing the contaminated waste into contact with a reductone in an aqueous solution to obtain a mixture having a pH value, and adjusting the pH value to permit dissociation of two hydrogen ions from an enediol group of the reductone and to permit subsequent reaction of the reductone with the electrophilic site of the halide contained in the contaminated waste, thereby resulting in removal of the halide.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
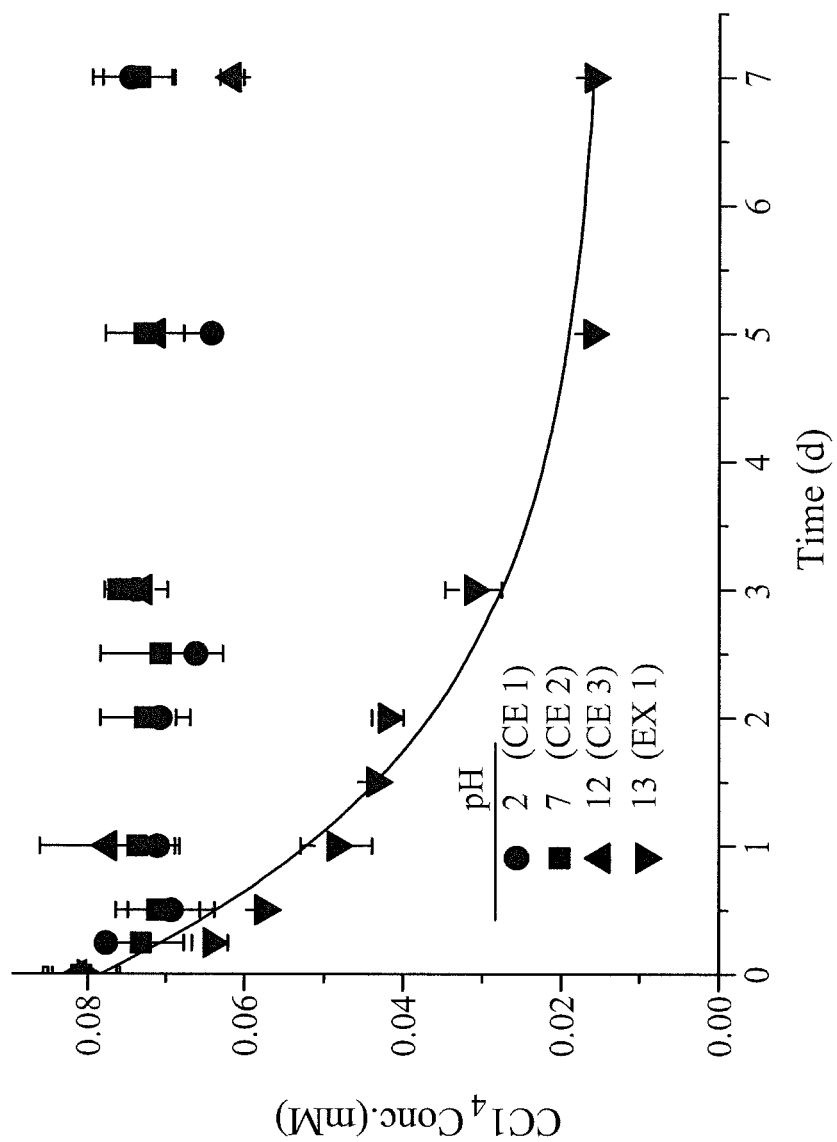
FIG. 1 is a plot illustrating the degradation of carbon tetrachloride versus time (days) in the case that carbon tetrachloride contaminated water was treated by L-ascorbic acid at different pH values.

A process for treating waste contaminated by a halide of carbon or nitrogen according to the preferred embodiment of this invention is disclosed. The halide contained in the contaminated waste has an electrophilic site. The process includes bringing the contaminated waste into contact with a reductone in an aqueous solution to obtain a mixture having a pH value, and adjusting the pH value to permit dissociation of two hydrogen ions from an enediol group of the reductone such that the reductone has a nucleophilic site and to permit subsequent reaction of the nucleophilic site of the reductone with the electrophilic site of the halide contained in the contaminated waste, thereby resulting in removal of the halide. The term "reductone" as used herein means a compound having an enediol structure with a carbonyl group adjacent to an enediol group. In this preferred embodiment, the halide is carbon tetrachloride. Examples of the reductone include ascorbic acid, tartronaldehyde, and reductic acid. In the preferred embodiment, the reductone is ascorbic acid.

The halide contaminated waste may be in an aqueous phase (waste water), a solid phase (waste soils), etc.

The ascorbic acid can be dissolved in the aqueous solution to dissociate into two different forms according to the pH value of the aqueous solution.

As shown in the following chemical equations (1) and (2), at different pH value, the ascorbic acid can be dissociated into different forms. In this invention, it is found that when the pH value of the mixture is maintained at a value which is greater than 11.8, carbon tetrachloride can be effectively reduced. Therefore, the pH value of the mixture is preferably greater than 11.8. In this preferred embodiment, the pH value is not less than 13, preferably ranges from 13 to 14.

The pH value is adjusted by dissolving a salt in the aqueous solution. The salt can be an alkali salt (such as sodium hydroxide, potassium hydroxide, etc.), phosphate salt (such as trisodium phosphate), hydrogen phosphate salt (such as disodium phosphate), dihydrogen phosphate salt (such as monosodium phosphate), carbonate salt (such as sodium carbonate), hydrogen carbonate salt (such as sodium hydrogen carbonate), etc.

In other preferred embodiments of this invention, the halide contaminated waste is brought into contact with the reductone in the presence of an iron-containing material. The iron-containing material can be magnetite ($Fe_3O_4$), hematite ($Fe_2O_3$), goethite (FeOOH), pyrite ($FeS_2$), soil, zerovalent iron, etc.

The present invention will now be explained in more detail below by way of the following experiments.

[Experiment 1]

Simulated carbon tetrachloride contaminated water was prepared by adding carbon tetrachloride to reverse osmosis (RO) water. The pH of the RO water was preliminarily adjusted. In experiment 1, degradation of carbon tetrachloride was observed when ascorbic acid was added to the carbon tetrachloride contaminated water having different pH values.

Example 1 (EX 1)

Carbon tetrachloride contaminated water having a pH value of 13 was prepared by adjusting the pH value of RO water to pH 13 using sodium hydroxide (≥99%, Sigma-Aldrich), adding pure carbon tetrachloride (ALPS CHEM Co. Ltd., Taiwan) to the RO water, followed by stirring for 12 hours at 20° C. such that the carbon tetrachloride contaminated water had a $CCl_4$ concentration of 0.08 mM. Then, a predetermined amount of L-ascorbic acid (99.7-100.5%, Sigma-Aldrich) was added to the carbon tetrachloride contaminated water and stirred for about 2 min to obtain a test solution which had the L-ascorbic acid in a concentration of 10 mM, and which was then poured in a plurality of 60 ml amber glass bottles, each bottle having 60 ml of the test solution. The glass bottles were shaken continuously on an IKA® HS 250 reciprocating shaker at 20° C.

<Chemical Analysis>

Every two glass bottles were taken out for analysis of the concentration of $CCl_4$ at predetermined times. The test solutions in the two glass bottles were extracted using n-pentane.

Specifically, in the process for extraction, 4 ml of test solution in each bottle was removed, and 3 ml of n-pentane was added thereto. The test solution in each bottle was shaken at 1400 rpm for 5 min using an orbital shaker (Thermolyne Maxi-Mix III™ Type 65800), and was further shaken at 120 rpm for 1 hour using an IKA® KS/HS 260 Reciprocating Shaker. The solution in each bottle was allowed to stand for a time period to collect a supernatant.

The supernatant was analyzed using a gas chromatograph (GC, Agilent 7890A) with an Agilent DB-624 column (60 m×0.25 mm i.d.) and a mass spectrometer (MS, Agilent 5975C). 1.0 µL of the test sample (the supernatant) was injected into the GC, and the GC inlet was held at 200° C. The carrier gas was helium, and was held at a constant flow rate of 1 mL/min. Column top pressure was set to 16.24 psi, and split ratio was set to 5:1. The GC oven temperature program included an initial temperature of 45° C. held for 3 min, a ramp of 8° C./min to 90° C., held for 4 min, and a ramp of 6° C./min to 104° C. The MS was operated in electron impact mode at 70 eV and in full scan mode between m/z 50 and m/z 260. From the signals obtained from the GC-MS, the concentration of $CCl_4$ was determined based on a calibration curve of $CCl_4$.

For plotting a calibration curve of $CCl_4$, five standard solutions with different $CCl_4$ concentrations were prepared. The five methanol standard solutions were extracted using n-pentane and analyzed using the GC-MS using the same procedures as those used to analyze the sampled solution.

The analyzed $CCl_4$ concentrations for the sampled solutions were plotted versus time (days), and the results are shown in FIG. 1.

In addition, on the 7$^{th}$ day, a glass bottle was taken out for measurement of the pH value and the redox potential (ORP). The ORP value of the test solution in the glass bottle was measured using a pH/Conductivity Meter (Eutech Instruments cyberscan PC 5000) with a Eutech Instruments Redox Electrode. The pH value and the ORP value are shown in Table 1.

<Degradation Rate of $CCl_4$>

Because the concentration of L-ascorbic acid (10 mM) was much higher than that of carbon tetrachloride (0.08 mM), the concentration value of the L-ascorbic acid (AA) could be regarded as a constant. Therefore, the $CCl_4$ degradation rate can be represented by a pseudo first order rate equation, i.e., the following equation (A):

$$r = -\frac{d[CCl_4]}{dt} = k_1[CCl_4] \quad (A)$$

where r is a degradation rate of $CCl_4$, that is, the differential concentration of $CCl_4$ ($d[CCl_4]$) in a predetermined time (t); $k_1$ is a pseudo first order reaction constant; and $[CCl_4]$ is a concentration of $CCl_4$.

If the differential equation (A) is integrated, it gives the following equation (B):

$$[CCl_4]_t = [CCl_4]_0 e^{-k_1 t} \quad (B)$$

where $[CCl_4]_t$ is a concentration of $CCl_4$ at time t; and $[CCl_4]_0$ is an initial concentration of $CCl_4$.

In this example, $[CCl_4]_t$ was determined by the above chemical analysis, and $[CCl_4]_0$ was 0.08 mM. Thus, the pseudo first order reaction constant ($k_1$) was calculated based on the above equation (B), and is shown in Table 1.

Comparative Example 1 (CE1)

Carbon tetrachloride contaminated water was prepared, treated, and tested according to the procedures mentioned in Example 1, except that the carbon tetrachloride contaminated water was prepared by adjusting the pH value of the reverse osmosis (RO) water to pH 2 using sulfuric acid (95-97%, Sigma-Aldrich), adding pure carbon tetrachloride to the RO water, followed by stirring for 12 hours at 20° C. such that the carbon tetrachloride contaminated water had a $CCl_4$ concentration of 0.08 mM. The analyzed $CCl_4$ concentrations for the sampled solutions were plotted versus time (days), and are shown in FIG. 1. The pH value, the ORP value, and the pseudo first order reaction constant ($k_1$) for Comparative Example 1 are listed in Table 1.

Comparative Example 2 (CE 2)

Carbon tetrachloride contaminated water was prepared, treated, and tested according to the procedures mentioned in Example 1, except that the carbon tetrachloride contaminated water was prepared by adding pure carbon tetrachloride to reverse osmosis (RO) water having a pH of 7, followed by stirring for 12 hours at 20° C. such that the carbon tetrachloride contaminated water had a $CCl_4$ concentration of 0.08 mM. The analyzed $CCl_4$ concentrations for the sampled solutions were plotted versus time (days), and are shown in FIG.

1. The pH value, the ORP value, and the pseudo first order reaction constant ($k_1$) for Comparative Example 2 are listed in Table 1.

Comparative Example 3 (CE 3)

Carbon tetrachloride contaminated water was prepared, treated, and tested according to the procedures mentioned in Example 1, except that the carbon tetrachloride contaminated water was prepared by adjusting the pH value of reverse osmosis (RO) water to pH 12 using sodium hydroxide, adding pure carbon tetrachloride to the RO water, followed by stirring for 12 hours at 20° C. such that the carbon tetrachloride contaminated water had a $CCl_4$ concentration of 0.08 mM. The analyzed $CCl_4$ concentrations for the sampled solutions were plotted versus time (days), and are shown in FIG. 1. The pH value, the ORP value, and the pseudo first order reaction constant ($k_1$) for Comparative Example 3 are listed in Table 1.

TABLE 1

| | AA/$CCl_4$ Conc. (mM) | Initial pH | Final pH | $k_1$ ($d^{-1}$) | ORP (mV) |
|---|---|---|---|---|---|
| EX 1 | 10/0.08 | 13 | 13 | 0.239 | −350 |
| CE 1 | 10/0.08 | 2 | 2 | 0.014 | 225 |
| CE 2 | 10/0.08 | 7 | 3 | 0.016 | 150 |
| CE 3 | 10/0.08 | 12 | 5 | 0.039 | 3 |

From the results shown in Table 1, it could be found that when both the initial and final pH values were greater than 11.8 (Example 1) which caused two hydrogen ions to be released from the L-ascorbic acid, the pseudo first order reaction constant ($k_1$) was much higher than those in Comparative examples 1 to 3. This is because when the contaminated water is treated with the same concentration of carbon tetrachloride, the degradation rate (r) is proportional to the pseudo first order reaction constant ($k_1$), i.e., the higher the pseudo first order reaction constant ($k_1$), the greater the degradation rate of carbon tetrachloride. Therefore, when the carbon tetrachloride contaminated water was treated by L-ascorbic acid at pH 13 (Example 1), carbon tetrachloride could be effectively degraded. FIG. 1 also shows the same results, i.e., on the 7th day, the $CCl_4$ concentration of Example 1 was much lower than those of Comparative Examples 1 to 3.

In experiment 1, a higher positive ORP value indicates that the less carbon tetrachloride was degraded. From the results shown in Table 1, it can be noted that when the final pH value was less than 11.8, the ORP value was positive (see Comparative Examples 1~3). In contrast, when the final pH value was higher than 11.8 (see Example 1), the ORP value was negative (−350 mV), meaning that the carbon tetrachloride in Example 1 was more effectively degraded.

[Experiment 2]

In experiment 2, the initial concentrations of carbon tetrachloride and L-ascorbic acid were altered for observing the formation rate of $CHCl_3$ and the degradation rate of $CCl_4$.

Example 2 (EX 2)

Carbon tetrachloride contaminated water was prepared, treated, and tested according to the procedures mentioned in Example 1, except that the chemical analysis was conducted on the 1st, 3rd, 5th, 7th, 14th, 21st and 28th days. After analyzing the test solution in each glass bottle using the GC-MS, the concentration of $CHCl_3$ was also determined based on a calibration curve of $CHCl_3$, which was plotted according to a method similar to that for plotting the calibration curve of $CCl_4$.

The formation of $CHCl_3$ can be represented by the following chemical equation.

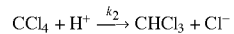

$$CCl_4 + H^+ \xrightarrow{k_2} CHCl_3 + Cl^-$$

The concentration of $CHCl_3$ can be represented by the following rate equation (C):

$$[CHCl_3]_t = \alpha[CCl_4]_0(1-e^{-k_1 t}) \quad (C)$$

where $\alpha = k_2/k_1$ and $k_2$ is a reaction constant for formation of $CHCl_3$.

The degradation rate of $CHCl_3$ can be represented by the following reaction equation (D):

$$r = \frac{d[CHCl_3]}{dt} = \alpha k_1 [CCl_4]_0 - k_3 [CHCl_3]_t \quad (D)$$

where $k_3$ is a reaction constant for degradation of $CHCl_3$.

$[CCl_4]_t$ and $[CHCl_3]_t$ were determined by the above chemical analysis, and $[CCl_4]_0$ was 0.08 mM. The reaction constants ($k_1$, $k_2$, $k_3$) and $\alpha$ could be calculated based on the above equations (B), (C) and (D), and are listed in Table 2 below. The pH value of the final sampled solution, and the ORP value of an extracted solution from the final sampled solution are also listed in Table 2.

Examples 3~6 (EX 3~EX 6)

In each of Examples 3~6, the carbon tetrachloride contaminated water was prepared, treated, and tested according to the procedures mentioned in Example 2. The initial concentrations of L-ascorbic acid and/or carbon tetrachloride, the reaction constants ($k_1$, $k_2$, $k_3$), $\alpha$ the pH values, and the ORP values for Examples 3 to 6 are listed in Table 2.

TABLE 2

| | AA/$CCl_4$ Conc. (mM) | Initial pH | Final pH | $k_1$ ($d^{-1}$) | $k_2$ ($d^{-1}$) | $k_3$ ($d^{-1}$) | $\alpha$ | ORP (mV) |
|---|---|---|---|---|---|---|---|---|
| EX 2 | 10/0.08 | 13 | 13 | 0.239 | 0.028 | 0.113 ± 0.017 | 0.118 | −449 |
| EX 3 | 5/0.08 | 13 | 13 | 0.124 | 0.010 | 0.091 ± 0.022 | 0.106 | −335 |
| EX 4 | 30/0.08 | 13 | 13 | 0.712 | 0.139 | 0.114 ± 0.021 | 0.195 | −401 |
| EX 5 | 10/0.32 | 13 | 13 | 0.262 | 0.039 | 0.130 ± 0.044 | 0.150 | −425 |
| EX 6 | 10/0.56 | 13 | 13 | 0.243 | 0.039 | 0.102 ± 0.044 | 0.162 | −428 |

In Examples 2 to 4, it was found that when the initial concentration of the L-ascorbic acid was increased, $k_1$, $k_2$, $k_3$ were also increased. That is, the degradation rate of $CCl_4$, the formation rate of $CHCl_3$, and the degradation rate of $CHCl_3$ were all enhanced. However, although the degradation rate of $CCl_4$ in Example 4 was higher than that in Example 2, the formation rate of $CHCl_3$ in Example 4 is much higher than that in Example 2, and the difference between the degradation rates of $CHCl_3$ in Examples 2 and 4 was negligible. Thus, it can be observed that although the degradation rate of $CCl_4$ in Example 4 was higher, $CCl_4$ in Example 4 could be more readily degraded into $CHCl_3$.

In Examples 5 and 6, although the initial concentrations of $CCl_4$ were different, the values of $k_1$, $k_2$, $k_3$, ORP of Examples 5 and 6 were similar. That is, the initial concentration of $CCl_4$ is irrelevant to the reaction constant ($k_1$, $k_2$, $k_3$). The degradation rate of $CCl_4$ was proportional to the initial concentration of $CCl_4$, since degradation rate equals to a product of the concentration of $CCl_4$ and the reaction constant ($k_1$).

[Experiment 3]

In experiment 3, carbon tetrachloride contaminated water was treated in the presence of iron minerals.

Examples 7~10 (EX 7~EX 10)

In each of Examples 7~10, carbon tetrachloride contaminated water was prepared, treated, and tested according to the procedures mentioned in Example 2, except that, before addition of the test solution to each 60 ml amber glass bottle, 0.5 g of an iron mineral was added to the bottle. The iron minerals for Examples 7~10 are listed in Table 3 below.

In each example, the specific surface area of the iron mineral was measured using a nitrogen sorption technique at 77K (BET Sorptometer, CBET-201A, Porous Material, Inc.). The specific surface area of the iron mineral, reaction constants ($k_1$, $k_2$, $k_3$) and a are listed in Table 3.

Comparative Examples 4~7 (CE 4~CE 7)

The carbon tetrachloride contaminated water of Comparative Examples 4~7 was prepared, treated, and tested according to the procedures mentioned in Examples 7~10, respectively, except that L-ascorbic acid was not added. Some of the test results are listed in Table 3.

TABLE 3

| | Iron Mineral | Specific surface area ($m^2g^{-1}$) | $k_{SA} \times 10^{-3}$ ($Ld^{-1}m^{-2}$)* | $k_1$ ($d^{-1}$) | $k_2$ ($d^{-1}$) | $k_3$ ($d^{-1}$) | α |
|---|---|---|---|---|---|---|---|
| EX 2 | — | — | — | 0.239 | 0.028 | 0.113 ± 0.017 | 0.118 |
| EX 7 | $Fe_3O_4$ | 20.747 | 1.661 | 0.287 | 0.059 | 0.087 ± 0.068 | 0.207 |
| CE 4 | $Fe_3O_4$ | 20.747 | — | — | — | — | — |
| EX 8 | $Fe_2O_3$ | 24.441 | 3.222 | 0.656 | 0.143 | 0.171 ± 0.013 | 0.218 |
| CE 5 | $Fe_2O_3$ | 24.441 | — | — | — | — | — |
| EX 9 | FeOOH | 29.671 | 4.171 | 1.031 | 0.554 | 0.166 ± 0.020 | 0.537 |
| CE 6 | FeOOH | 29.671 | — | — | — | — | — |
| EX 10 | $FeS_2$ | 34.950 | 3.634 | 1.058 | 0.686 | 0.237 ± 0.011 | 0.649 |
| CE 7 | $FeS_2$ | 34.950 | 2.844 | 0.828 | 0.262 | 0.173 ± 0.029 | 0.317 |

*$k_{SA} = k_1$ ($day^{-1}$)/(specific surface area of iron mineral ($m^2g^{-1}$) × concentration of iron mineral ($gL^{-1}$))

From the results shown in Table 3, it could be found that although the carbon tetrachloride contaminated water was substantially not reduced by the mere addition of the iron minerals ($Fe_3O_4$, $Fe_2O_3$, FeOOH) (see Comparative Examples 4~6), it was effectively reduced by L-ascorbic acid in the presence of the iron minerals ($Fe_3O_4$, $Fe_2O_3$, FeOOH) (see Examples 7~9). In addition, the carbon tetrachloride was reduced by $FeS_2$ in the absence of L-ascorbic acid (see Comparative Example 7), the reduction/degradation of $CCl_4$ was further enhanced when L-ascorbic acid was also added (see Example 10).

[Experiment 4]

In experiment 4, carbon tetrachloride contaminated water was treated in the presence of soil.

Example 11 (EX 11)

Figure 2:
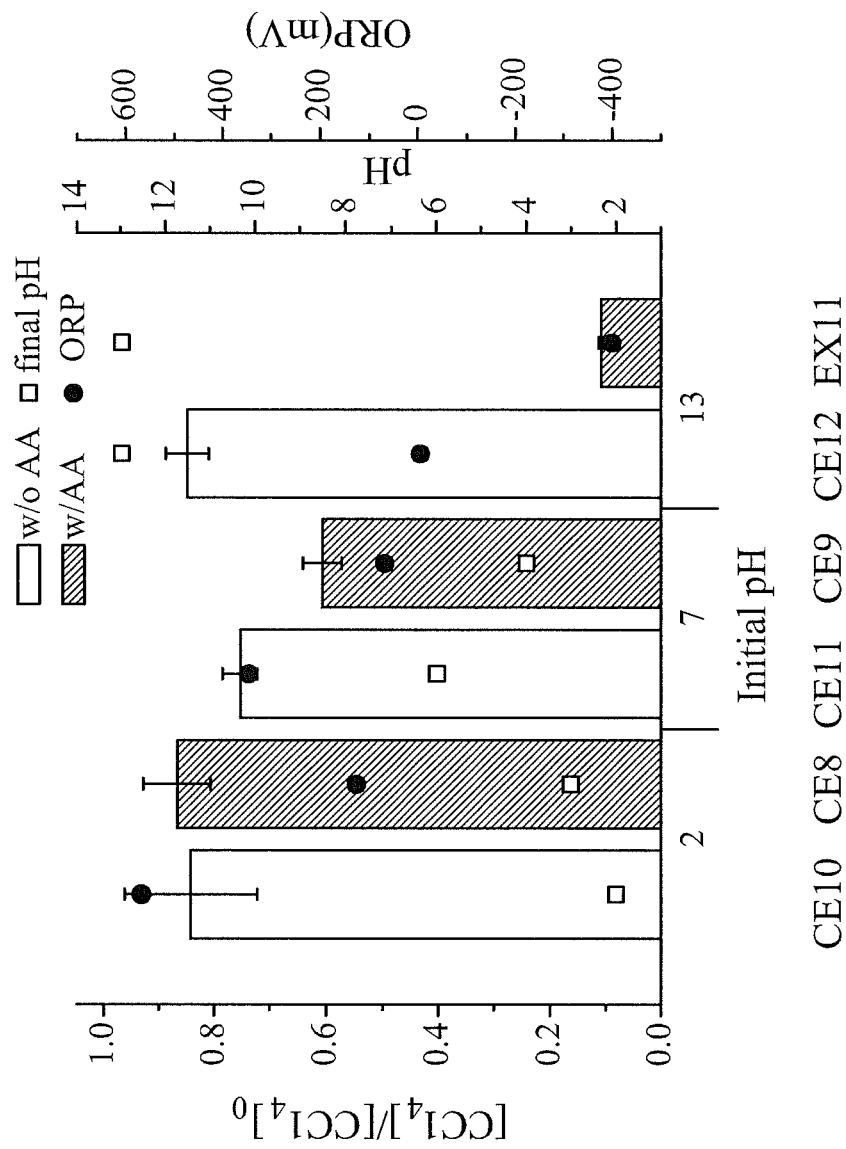
FIG. 2 is a diagram illustrating the degradation of carbon tetrachloride versus initial pH values when the carbon tetrachloride contaminated water was treated in the presence/absence of L-ascorbic acid.

Carbon tetrachloride contaminated water was prepared, treated, and tested according to the procedures mentioned in Example 1, except that, before addition of the test solution to each 60 ml amber glass bottle, 10 g of soil was added to the bottle. The soil used was obtained from farmland located in southern Taiwan and collected from soil layers approximately 30-100 cm below ground surface. The characterization of the soil was reported in Liang et al. (Liang, C.; Huang C.-F.; Chen, Y.-J. Potential for activated persulfate degradation of BTEX contamination. Water Res. 2008, 42, 4091-4100). Prior to use, the soil was air-dried and sieved (i.e., passed sieve #30 mesh and retained on sieve #200). The test solution was sampled on the $7^{th}$ day, and some of the test results are shown in FIG. 2.

Comparative Examples 8~9 (CE 8~CE 9)

Carbon tetrachloride contaminated water of Comparative Examples 8~9 was prepared, treated, and tested according to the procedures mentioned in Comparative Examples 1 and 2, respectively, except that, before addition of the test solution to each 60 ml amber glass bottle, 10 g of soil was added to the bottle. The soil used was obtained and treated in the same way as described in Example 11. Some of the test results are shown in FIG. 2.

Comparative Examples 10~12 (CE 10~CE 12)

Carbon tetrachloride contaminated water of Comparative Examples 10~12 was prepared, treated, and tested according to the procedures mentioned in Comparative Examples 8, 9, and Example 11, respectively, except that L-ascorbic acid was not added. The test solution was sampled on the $7^{th}$ day, and some of the test results are shown in FIG. 2.

From the results shown in FIG. 2, it can be seen that although the carbon tetrachloride contaminated water was treated in the presence of soil in all of Example and Comparative Examples 8~12, $CCl_4$ was not effectively reduced/degraded when the pH was 2 or 7, or when L-ascorbic acid was not added (i.e., without L-ascorbic acid (w/o AA)). Example 11, in which the carbon tetrachloride was reduced by L-ascorbic acid (w/AA) in the presence of soil, had the lowest ORP value and the lowest $[CCl_4]/[CCl_4]_0$. The carbon tetrachloride in Example 11 was reduced in the most effective way.

[Experiment 5]

In experiment 5, the adjustment of pH was performed using a phosphate solution.

Examples 12~15 (EX 12~EX 15)

Carbon tetrachloride contaminated water of Examples 12~15 was prepared, treated, and tested according to the procedures mentioned in Examples 7~10, respectively, except that the RO water was adjusted to pH 13 using monosodium phosphate, disodium phosphate, and monosodium phosphate. The test solution was sampled on the $7^{th}$ day, and some of the test results are shown in FIG. 3.

Comparative Examples 13~16 (CE 13~CE 16)

Carbon tetrachloride contaminated water of Comparative Examples 13~16 was prepared, treated, and tested according to the procedures mentioned in Examples 12~15, respectively, except that L-ascorbic acid was not added. The test solution was sampled on the $7^{th}$ day, and some of the test results are shown in FIG. 3.

Figure 3:
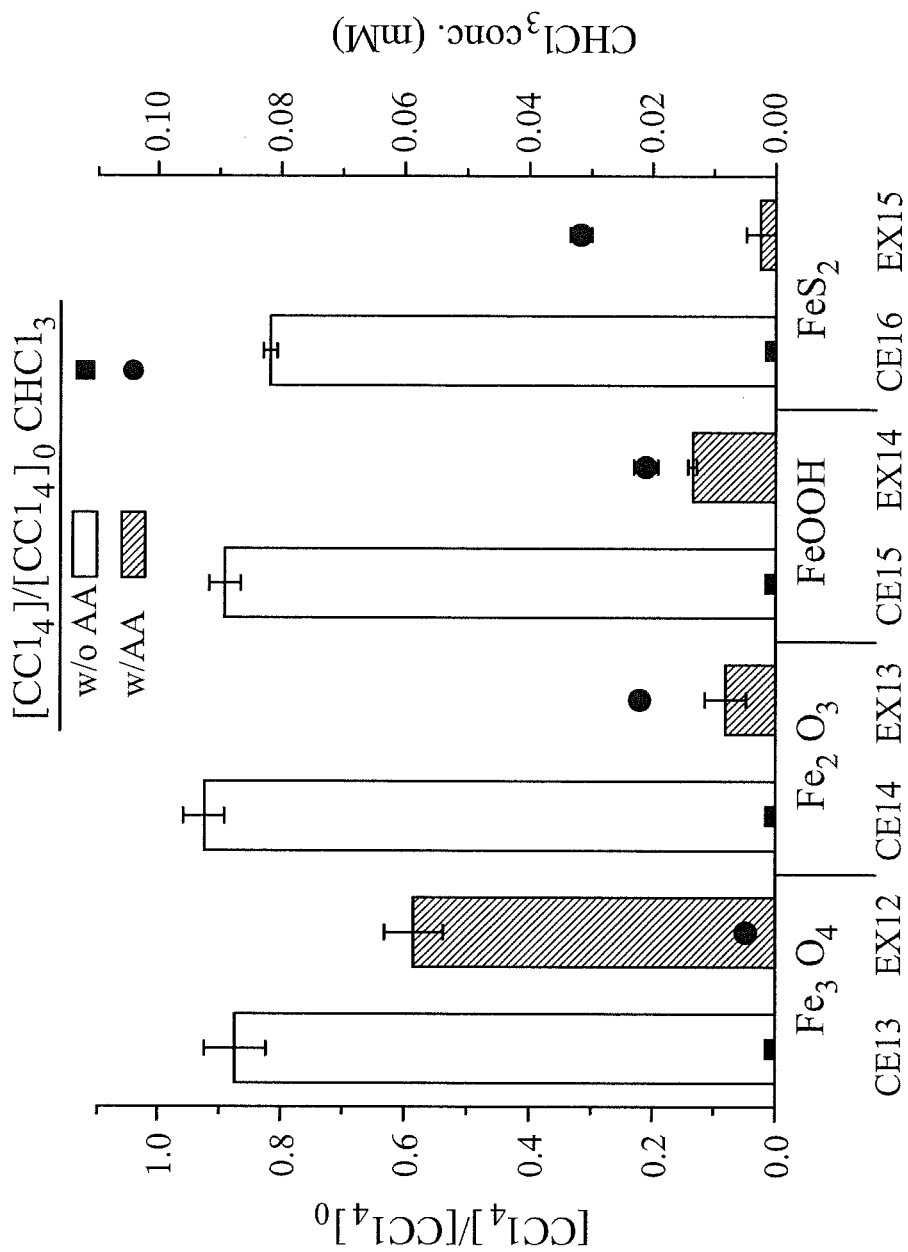
FIG. 3 is a diagram illustrating the degradation of carbon tetrachloride when the carbon tetrachloride contaminated water was treated using iron minerals in the presence/absence of L-ascorbic acid.

From the results shown in FIG. 3, it is noted that when the pH was adjusted using phosphate salts, the carbon tetrachloride could be effectively reduced by L-ascorbic acid in the presence of the iron minerals ($Fe_2O_3$, FeOOH, $FeS_2$) (see Examples 13~15).

[Experiment 6]

In experiment 6, the carbon tetrachloride contaminated water had a pH value greater than 14.

Examples 16~20 (EX 16~EX 20)

Carbon tetrachloride contaminated water of Examples 16~20 was prepared, treated, and tested according to the procedures mentioned in Examples 1 and 12~15, respectively, except that sodium hydroxide was added to the RO water to obtain a NaOH concentration of 2M. The final pH was not less than 13. That is, the carbon tetrachloride was reduced at a pH ranging from 13 to 14. The test solution was sampled on the $7^{th}$ day, and some of the test results are shown in FIG. 4.

Comparative Examples 17~20 (CE 17~CE 20)

Carbon tetrachloride contaminated water of Comparative Examples 17~20 was prepared, treated, and tested according to the procedures mentioned in Examples 17~20, respectively, except that L-ascorbic acid was not added. The test solution was sampled on the $7^{th}$ day, and some of the test results are shown in FIG. 4.

Figure 4:
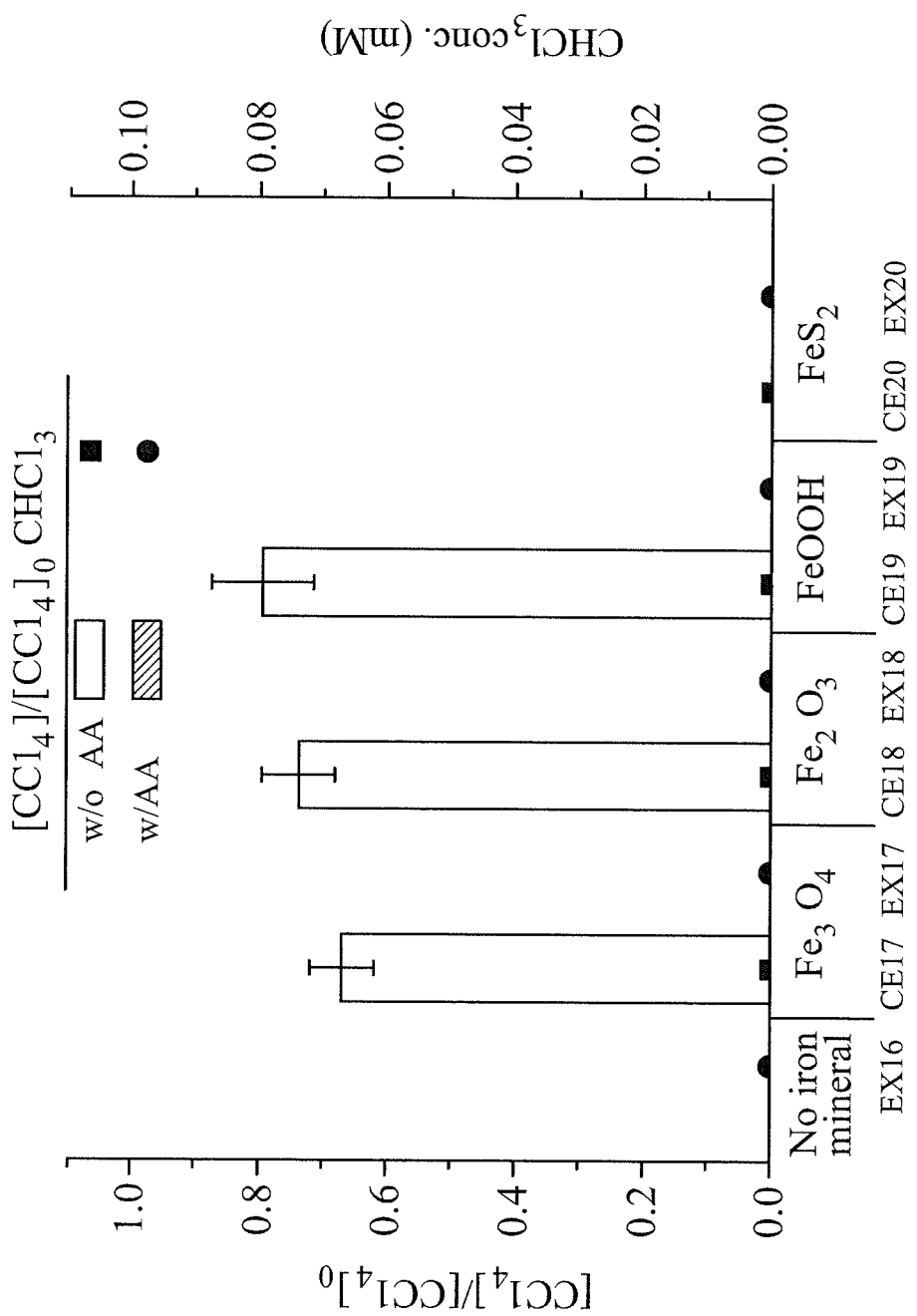
FIG. 4 is a diagram similar to FIG. 3, but the carbon tetrachloride contaminated water was treated at an initial pH greater than 14.

From the results shown in FIG. 4, it can be seen that when the carbon tetrachloride was treated at a pH ranging from 13 to 14, it can be completely degraded by L-ascorbic acid (see Examples 16~20) regardless of whether iron mineral was added. In addition, when carbon tetrachloride was reduced at a pH ranging from 13 to 14, the formation of $CHCl_3$ was not observed on the $7^{th}$ day.

[Experiment 7]

In experiment 7, the carbon tetrachloride contaminated water was treated in the presence of soils at different initial pH values.

Example 21 (EX 21)

Figure 5:
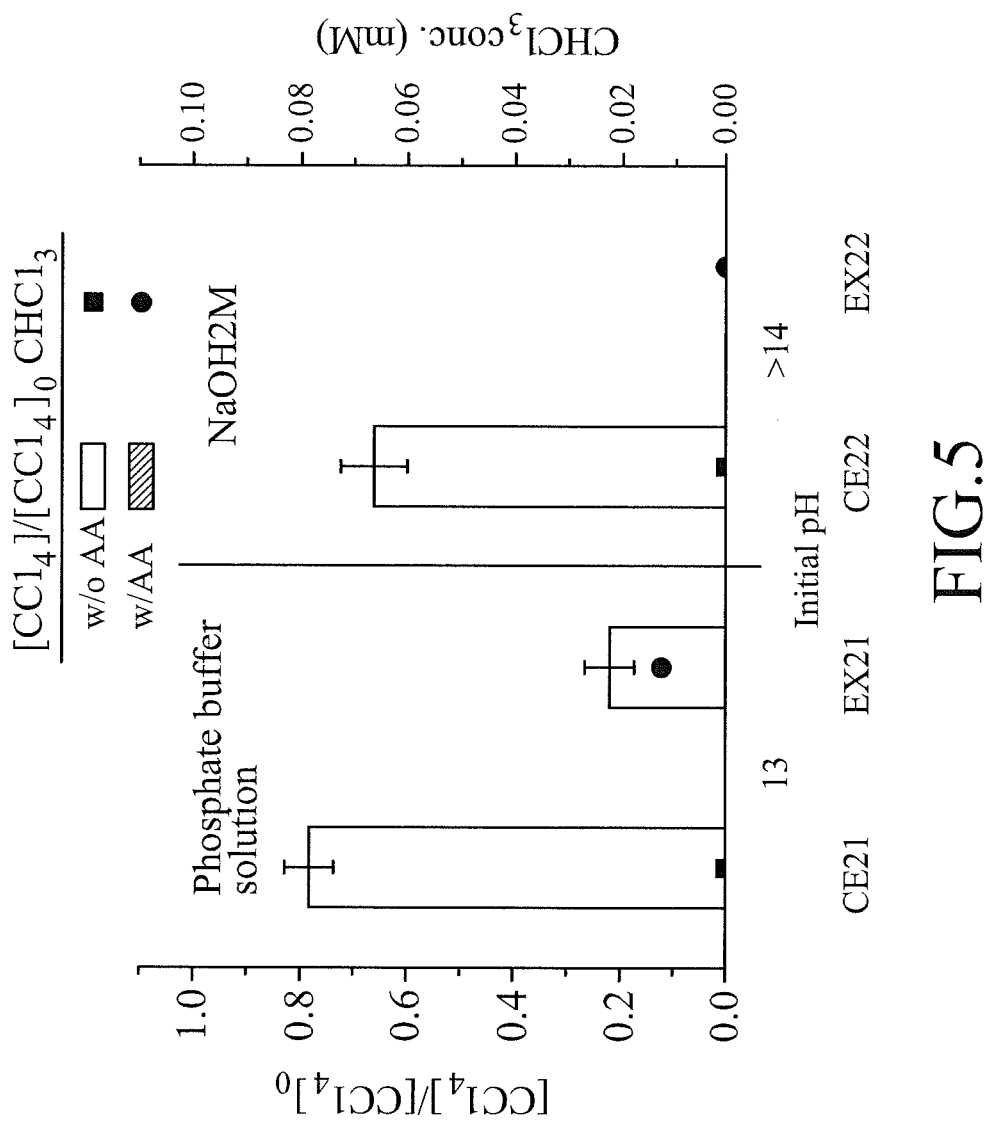
FIG. 5 is a diagram illustrating the degradation of carbon tetrachloride when the carbon tetrachloride contaminated water was treated in the presence of soils at different initial pH values.

Carbon tetrachloride contaminated water was prepared, treated, and tested according to the procedures mentioned in Example 11, except that the RO water was adjusted to pH 13 using monosodium phosphate, disodium phosphate, and monosodium phosphate. The test solution was sampled on the $7^{th}$ day, and some of the test results are shown in FIG. 5.

Example 22 (EX 22)

Carbon tetrachloride contaminated water was prepared, treated, and tested according to the procedures mentioned in Example 11, except that sodium hydroxide was added to the RO water to obtain a NaOH concentration of 2M. The final pH was not less than 13. The test solution was sampled on the $7^{th}$ day, and some of the test results are shown in FIG. 5.

Comparative Examples 21~22 (CE 21~CE 22)

Carbon tetrachloride contaminated water in Comparative Examples 21~22 was prepared, treated, and tested according to the procedures mentioned in Examples 21~22, respectively, except that L-ascorbic acid was not added. The test solution was sampled on the $7^{th}$ day, and some of the test results are shown in FIG. 5.

From the results shown in FIG. 5, it can be observed that when the initial pH was greater than 14 and L-ascorbic acid was added, the carbon tetrachloride could be fully degraded.

[Experiment 8]

In experiment 8, carbon tetrachloride contaminated water was treated in the presence of zerovalent iron.

Example 23 (EX 23)

Carbon tetrachloride contaminated water was prepared, treated, and tested according to the procedures mentioned in Example 1, except that, before addition of the test solution to each 60 ml amber glass bottle, 0.5 g of zerovalent iron was added to the bottle. The zerovalent iron had a specific surface area of 182.899 $m^2$/g. The test solution was sampled on the $7^{th}$ day, and some of the test results are listed in Table 4 below.

Comparative Example 23 (CE 23)

Carbon tetrachloride contaminated water was prepared, treated, and tested according to the procedures mentioned in Example 23, except that L-ascorbic acid was not added. The test solution was sampled on the $7^{th}$ day, and some of the test results are listed in Table 4.

Comparative Examples 24~25 (CE 24~CE 25)

Carbon tetrachloride contaminated water of Comparative Examples 24~25 were prepared, treated, and tested according to the procedures mentioned in Comparative Examples 1 and 2, respectively, except that, before addition of the test solution to each 60 ml amber glass bottle, 0.5 g of zerovalent iron was added to the bottle. The zerovalent iron had a specific surface area of 182.899 $m^2$/g. The test solution was sampled on the $7^{th}$ day, and some of the test results are listed in Table 4.

Comparative Examples 26~27 (CE 26~CE 27)

Carbon tetrachloride contaminated water of Comparative Examples 26~27 was prepared, treated, and tested according to the procedures mentioned in Comparative Examples 24~25, respectively, except that L-ascorbic acid was not added. The test solution was sampled on the $7^{th}$ day, and some of the test results are listed in Table 4.

TABLE 4

| | L-ascorbic acid | Final pH | $k_{SA} \times 10^{-3}$ ($Ld^{-1}m^{-2}$) | $k_1$ ($d^{-1}$) | $k_2$ ($d^{-1}$) | $k_3$ ($d^{-1}$) | α |
|---|---|---|---|---|---|---|---|
| EX 23 | Added | 13 | 0.157 | 0.239 | 0.028 | 0.113 ± 0.017 | 0.118 |
| CE 23 | — | 13 | —* | — | — | — | — |
| CE 24 | Added | 2 | 0.702 | 1.069 | 0.405 | — | 0.379 |
| CE 25 | Added | 7 | 0.172 | 0.262 | 0.193 | 0.0009 ± 0.009 | 0.735 |
| CE 26 | — | 2 | 0.716 | 1.091 | 0.442 | — | 0.450 |
| CE 27 | — | 7 | 0.162 | 0.247 | 0.155 | 0.0009 ± 0.009 | 0.628 |

*Not available

In Example 23 and Comparative Example 23, when the carbon tetrachloride contaminated water was treated at pH 13, the degradation of carbon tetrachloride was not significant (see Comparative Example 23). However, carbon tetrachloride was reduced at pH 2 or 7 in the presence of zerovalent iron regardless of whether L-ascorbic acid was added.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A process for treating waste contaminated by a halide of carbon or nitrogen, the halide contained in the contaminate waste having an electrophilic site, the process comprising the following steps of:

bringing the contaminated waste into contact with a reductone in an aqueous solution to obtain a mixture having a pH value; and adjusting the pH value to permit dissociation of two hydrogen ions from an enediol group of the reductone and to permit subsequent reaction of the reductone with the electrophilic site of the halide contained in the contaminated waste, thereby resulting in removal of the halide, wherein the reductone includes ascorbic acid and the pH value is greater than 11.8.

2. The process of claim 1, wherein the halide is carbon tetrachloride.

3. The process of claim 1, wherein the pH value ranges from 13 to 14.

4. The process of claim 1, wherein the pH value is adjusted by dissolving an alkali salt in the aqueous solution, the alkali salt being selected from the group consisting of sodium hydroxide, potassium hydroxide, and a combination thereof.

5. The process of claim 1, wherein the pH value is adjusted by dissolving in the aqueous solution of a salt selected from the group consisting of phosphate salt, hydrogen phosphate salt, dihydrogen phosphate salt, carbonate salt, hydrogen carbonate salt, and a combination thereof.

6. The process of claim 1, wherein the contaminated waste is brought into contact with the reductone in the presence of an iron-containing material.

7. The process of claim 6, wherein the iron-containing material is selected from the group consisting of magnetite, hematite, goethite, pyrite, soil, zerovalent iron, and a combination thereof.

* * * * *